Nov. 3, 1925.
1,560,317
J. W. RAUCH ET AL
SAW GRINDER
Filed Jan. 28, 1925
3 Sheets-Sheet 2
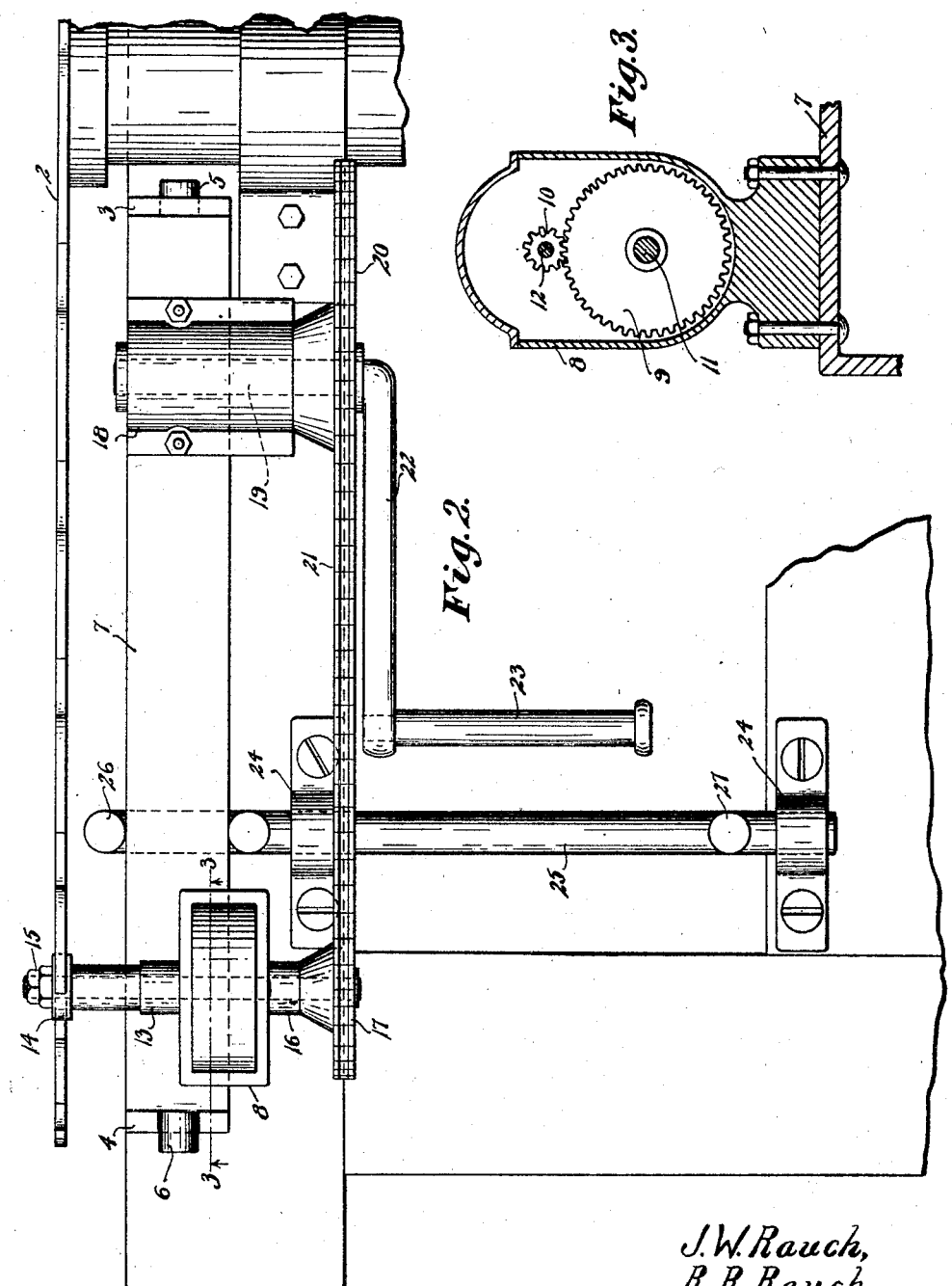
J.W. Rauch,
R.R. Rauch,
INVENTOR
BY Victor J. Evans,
ATTORNEY
WITNESS:

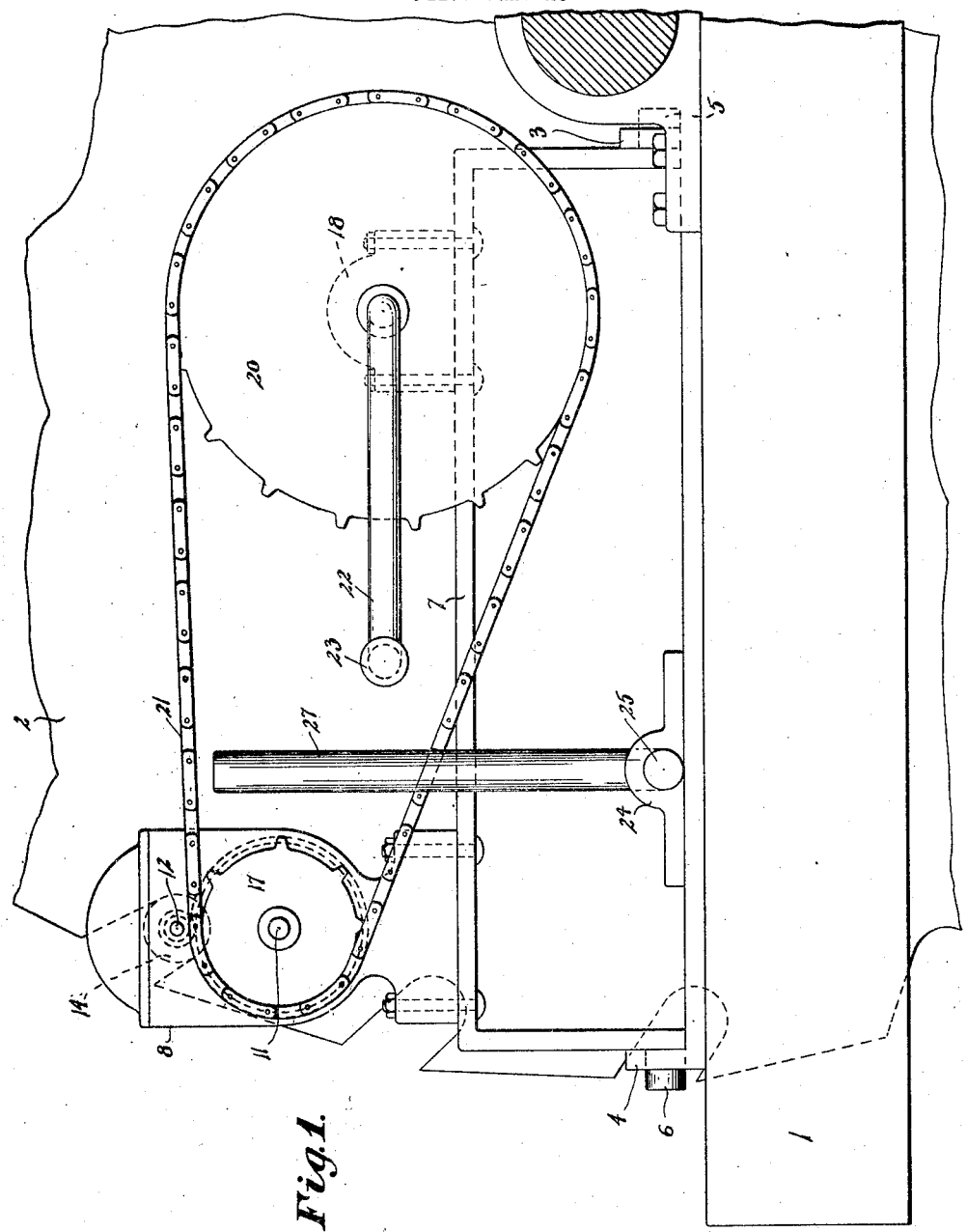

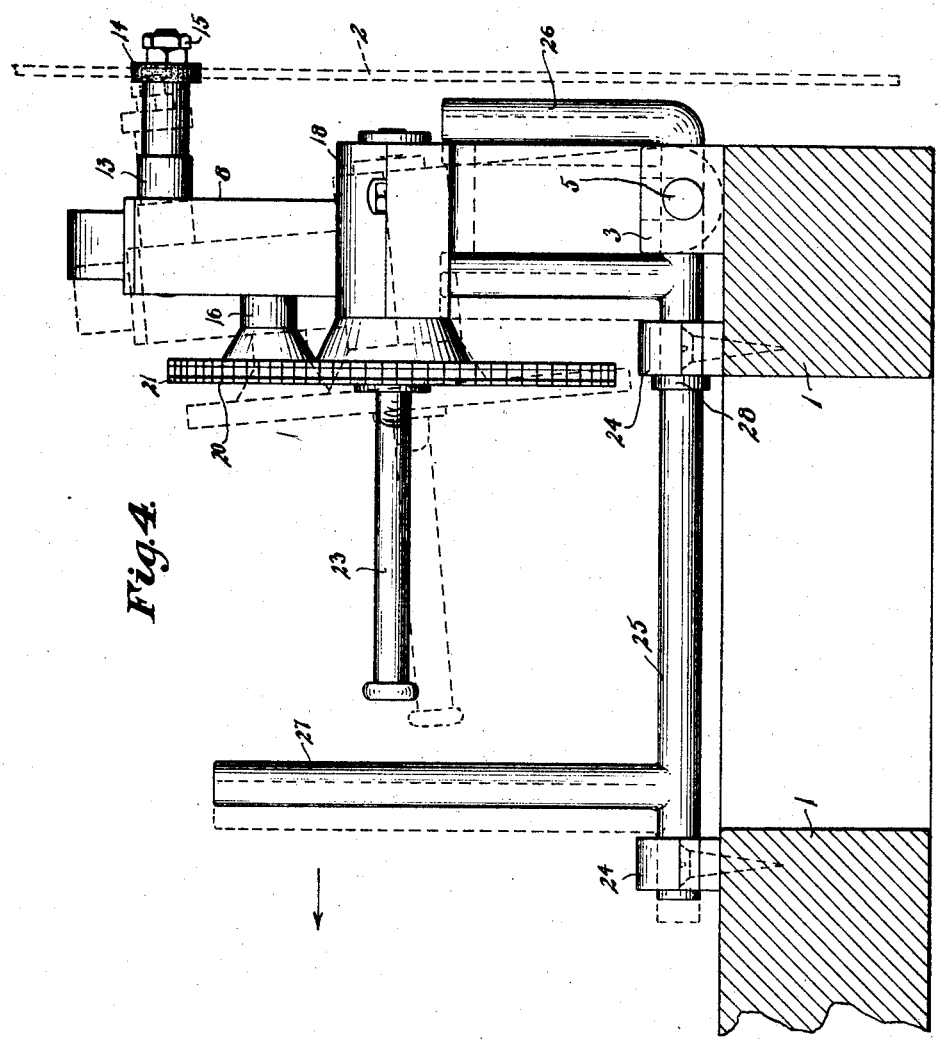

Patented Nov. 3, 1925.

1,560,317

UNITED STATES PATENT OFFICE.

JOHN W. RAUCH AND ROYAL R. RAUCH, OF NEWPORT, WASHINGTON.

SAW GRINDER.

Application filed January 28, 1925. Serial No. 5,401.

*To all whom it may concern:*

Be it known that we, JOHN W. RAUCH and ROYAL R. RAUCH, citizens of the United States, residing at Newport, in the county of Pend Oreille and State of Washington, have invented new and useful Improvements in Saw Grinders, of which the following is a specification.

Our present invention has reference to a means for grinding and sharpening the teeth of circular saws and most especially to circular saws having inserted teeth.

Our object is the provision of a means for this purpose which can be readily attached to the bed of a circular saw and which will separately grind the teeth of the saw without necessitating the removal of the saw from its mandrel.

A still further object is the provision in a grinding device for the teeth of circular saws of a grinding stone which is round in plan and which may have a flat active surface or periphery, or whose periphery may be rounded from the center to the sides thereof in accordance with the shape of the saw teeth to be operated on, and wherein simple means is provided for guiding the stone to its work and means, either hand or power operated is also provided for imparting a rapid rotary motion to the grinding stone.

A still further object is the provision of a device for this purpose characteristic of simplicity in construction, cheapness in manufacture, coupled with ease and accuracy in operation.

With the above broadly stated objects in view, the invention further resides in the construction, combination and operative association of parts such as is disclosed by the drawings which accompany and which form part of this application.

In the drawings:—

Figure 1 is a side elevation of our improvement.

Figure 2 is a top plan view thereof.

Figure 3 is a sectional view on the line 3—3 of Figure 2.

Figure 4 is an end view, a portion of the saw bed being in section.

Referring now to the drawings in detail, the timbers constituting the bed for a circular saw, are indicated by the numeral 1. On the bed the saw 2 is mounted in the usual manner, the means for imparting motion to the saw not being illustrated.

On the bed 1 there are secured bearings 3 and 4 respectively. The bearing 3 has a central opening therethrough and the bearing 4 is notched from its outer edge. The openings in the bearings receive therethrough short shafts or trunnions 5 and 6 on the ends of the vertical members of a substantially U-shaped frame 7. The frame 7 is arranged in parallelism with the saw 2, the said frame having on its upper portion, and adjacent to what I will term its outer end, (that is, the end provided with the trunnion 6) a housing 8. The top of the housing is preferably removable and arranged in the said housing there is a comparatively large gear wheel 9 which meshes with a pinion 10. The shaft for the gear 9 is indicated by the numeral 11 and that for the gear by the numeral 12. Both of these shafts are journaled in suitable bearing openings in the sides of the housing, and the shaft 12 also passes through a bearing hub 13 on the outer face of the housing. The outer end of the shaft 13 is threaded, and inward of its threads is preferably square in cross section, the said squared portion engaging the walls of a squared central opening in a grinding stone 14, while nuts 15 are screwed on the shaft to hold the stone firmly on said shaft. The grinding stone 14 is round in plan and which, if desired, may have its periphery rounded from its center to its sides. This shape of stone is desired when hollow saw teeth are to be ground.

The shaft 11 passes through a bearing hub 16 on the inner face of the housing 8, and secured on the outer end of the said shaft there is a sprocket wheel 17.

On the top of the frame 7, adjacent the inner end thereof, there is secured a bearing 18 in which is journaled a shaft 19. Suitable means is provided for holding the shaft from longitudinal movement in its bearing, and the said shaft has fixed thereon a sprocket wheel 20 arranged in a line with the sprocket wheel 17. Around the sprocket wheels 17 and 20 there is trained a chain 21. The shaft 19 is formed on its inner end with an angle extension 22 on whose outer end there is secured a preferably revoluble handle 23.

The sprocket wheel 20 is materially larger than the sprocket wheel 17, and incident to the comparatively large gear 19 that meshes with the pinion 10, it will be apparent that each turn of the handle and the sprocket wheel 20 will revolve the stone carrying shaft 12 a comparatively great number of times and with great rapidity.

Fixed on the bed 1 there are spaced bearing members 24 through which there is slidably received a rod 25. The rod has angle parallel spaced fingers 26 that straddle the frame 7 and whose outer ends are designed for contacting engagement with the upper member of the said frame. Also formed on the rod 25 and extending therefrom in an upward direction as do the fingers 26 there is a handle 27. The rod 25 is held from free turning in the bearings 24 either by squaring portions of the rod and the bores of he bearing or by frictional engagement between the bore of the bearings and the said rod. It will be apparent that by a pull on the handle 27 in the direction of the arrow in Figure 4, the rod 25 will be moved longitudinally so that the fingers 26 thereof will swing the frame 7 and the elements carried thereby to the position illustrated by the dotted lines in the said Figure 4. It will be likewise apparent that when the handle is moved to its full line position, the inner finger 26, contacting the frame, will swing the latter and the elements carried thereby to normal vertical position. The last mentioned slidable movement of the rod 25 is limited by providing the said rod with a contact member 25 which is contactable with one of the bearings 24.

When not in use, the frame 7 is removed from the bed 1 and the rod 25 is turned in its bearings to allow its fingers and lever to lie on the bed, and thus the fixed elements of the device will offer practically no obstructions to the bed when the employment of the improvement is not required.

It is believed that the foregoing description, when taken in connection with the drawings, will fully set forth the construction, operation and advantages of our improvement to those skilled in the art to which this invention relates. It is to be understood, however, that we are not to be limited to size, proportion, material employed and to details of construction, as the invention is limited only to the scope of the appended claim.

Having described the invention, we claim:—

A means for grinding and sharpening the teeth of a circular saw, in which the said saw is journaled on a bed, comprising a substantially U-shaped frame whose ends are removably journaled in bearings on the bed, a housing on the frame, oppositely directed shafts journaled in bearings in and projecting through the housing, a gear on one of the shafts, a pinion on the other shaft in mesh with the gear, a grinding stone removably secured on the last mentioned shaft, a sprocket wheel on the end of the other shaft, a bearing fixed on the frame, a shaft having a crank handle journaled in the bearing, a comparatively large sprocket wheel secured on the shaft and a sprocket chain trained around this wheel and around the first mentioned sprocket wheel, a rod slidable in bearings on the frame, spaced fingers on the rod straddling the frame, and an operating handle for the rod, for the purpose set forth.

In testimony whereof we affix our signatures.

JOHN W. RAUCH.
ROYAL R. RAUCH.